United States Patent [19]

Schwartz, Jr. et al.

[11] 4,148,841
[45] * Apr. 10, 1979

[54] HALOGEN CONTAINING POLYESTER RESINS HAVING IMPROVED SMOKE-RETARDANCE

[75] Inventors: Willis T. Schwartz, Jr.; Edwin Dorfman, both of Grand Island; Raymond R. Hindersinn, Lewiston, all of N.Y.

[73] Assignee: Hooker Chemicals & Plastics Corp., Niagara Falls, N.Y.

[*] Notice: The portion of the term of this patent subsequent to Sep. 28, 1993, has been disclaimed.

[21] Appl. No.: 726,033

[22] Filed: Sep. 23, 1976

Related U.S. Application Data

[63] Continuation-in-part of Ser. No. 514,984, Oct. 10, 1974, Pat. No. 3,983,185, and Ser. No. 642,026, Feb. 18, 1975, Pat. No. 4,013,815, said Ser. No. 514,984, is a continuation-in-part of Ser. No. 383,749, Jul. 30, 1973, abandoned, and Ser. No. 490,423, Jul. 22, 1974, abandoned, said Ser. No. 642,026, is a continuation-in-part of said Ser. No. 383,749, and Ser. No. 692,624, Jun. 3, 1976, which is a continuation-in-part of said Ser. No. 490,423.

[51] Int. Cl.² .............................................. C08L 67/06
[52] U.S. Cl. .............................. 260/862; 260/45.75 B; 260/45.75 D; 260/45.75 P; 260/863; 260/869; 260/872
[58] Field of Search ................. 260/863, 869, 45.75 B, 260/45.75 D, 45.75 P, 862, 872

[56] References Cited

U.S. PATENT DOCUMENTS

| | | | |
|---|---|---|---|
| 3,536,782 | 10/1970 | Toggweiler et al. | 260/869 |
| 3,983,185 | 9/1976 | Dorfman et al. | 260/863 |

*Primary Examiner*—J. Ziegler
*Attorney, Agent, or Firm*—Peter F. Casella; James F. Mudd; David A. Stein

[57] ABSTRACT

Fire retardant polymer compositions having improved smoke-retardance are prepared from:
  (1) a copolymerizable mixture of:
    (a) from about 50 to 80 weight percent of an $\alpha$-,$\beta$-, ethylenically unsaturated halogen-containing polyester of a polycarboxylic compound and a polyhydric alcohol, the polyester containing halogen in a proportion of greater than about 4 weight percent said halogen having been introduced subsequent to preparation of the polyester by esterification; and
    (b) from about 20 to about 50 weight percent of a mixture of unsaturated monomers comprising a vinylbenzene compound and an acrylic compound selected from the group consisting of acrylic acid, methacrylic acid and esters of these acids, the weight ratio of vinylbenzene compound to acrylic compound being about 1:4 to 4:1; and
  (2) an effective fire retardant proportion of about 0.5 to about 10 weight percent of a smoke inhibiting additive comprising at least 0.5 weight percent of a compound of iron as the sole fire retardant additive or as a component of an additive mixture of an iron compound and an antimony compound and/or a copper compound.

45 Claims, No Drawings

HALOGEN CONTAINING POLYESTER RESINS HAVING IMPROVED SMOKE-RETARDANCE

REFERENCE TO CO-PENDING APPLICATIONS

This application is a continuation-in-part of our co-pending application Ser. No. 692,624 filed June 3, 1976, and Ser. No. 642,026, filed DEc. 18, 1975 now U.S. Pat. No. 4,013,815 Ser. No. 514,984 filed Oct. 10, 1974, now U.S. Pat. No. 3,983,185 which in turn is a continuation-in-part of application Ser. No. 383,749, now abandoned, filed July 30, 1973, and Ser. No. 490,423 filed July 22, 1974, now abandoned.

This application is also a continuation-in-part of co-pending application Ser. No. 642,026 filed Dec. 18, 1975 now U.S. Pat. No. 4,013,815 (which is a continuation-in-part of aforementioned application Ser. No. 383,749) and a continuation-in-part of copending application Ser. No. 692,624 filed June 3, 1976 (which is a continuation-in-part of aforementioned application Ser. No. 490,423).

BACKGROUND OF THE INVENTION

During recent decades, the growth of the plastics industry and ever-increasing use of polymeric materials has coincided wtih an increasing awareness and concern for the safety hazards, especially with regard to fire hazards of such materials. One result has been the development of various fire retardant additives of polymeric compositions. In past years, the major emphasis in the development of such fire retardant compositions has been in the achievement of low burning rates. More recently, however, there has been an increasing recognition of the hazards of smoke generation during fire and the advantages of char formation in inhibiting combustion. Furthermore, it is now more generally recognized that low burning rates do not necessarily imply or result in low smoke generation or beneficial char formation. As a result, the need is now recognized for the development of improved fire retardant polymeric systems having not only low burning rates, but low smoke generation and high char formation.

Among the developments in the field of fire retardant polymeric systems in recent years, the development of polymeric systems employing antimony trioxide as a fire retardant additive has been outstanding. Antimony trioxide has been found especially effective for use in systems based on halogen containing polymers. The effectiveness of antimony trioxide, as well as other antimony compounds as a fire retardant additive to halogen containing polymers is generally recognized and has been described as a synergistic effect between antimony and halogen. Despite its generally recognized effectiveness in such systems, the use of antimony trioxide, as well as other antimony compounds, has been found to result in certain disadvantages. For example, although the use of antimony compounds has been shown in many instances to advantageously decrease flammability and burning rate of polymer systems, it appears to provide little advantage in inhibiting formation of smoke and in some instances has been found to increase smoke formation. In addition, in recent years, the rapidly rising cost of antimony compounds has been an economic disadvantage.

As a result of these disadvantages associated with the use of antimony compounds as fire retardant additives, considerable effort has been expended in a search for other fire retardant additive. However, the effectiveness of a particular fire retardant additive in a polymeric system is generally unpredictable and an additive useful and compatible in one polymeric system amy be ineffective or even harmful with regard to fire retardance as well as other properties when used in a different polymeric system. Even more unpredictable is the effect achieved when fire retardant additives are combined. Combinations of various fire retardant additives may result in a beneficial or detrimental formulation with a given polymeric system. Furthermore, combinations of fire retardant additives may benefit one aspect of fire retardance and be detrimental to another.

It is known from *The Journal of Fire and Flammability*, 51-84, 1972, James J. Pitts, that in some instances at relatively high levels of addition, iron oxides or copper oxides may serve effectively as a partial replacement for antimony oxide in chlorine containing urethane foams. The use of iron or copper oxides in combination or in combination with antimony oxide at lower levels of addition or in other polymer systems is not shown.

It is also disclosed in aforementioned application Ser. No. 383,749, filed July 30, 1973, now abandoned, and aforementioned copending application Ser. No. 642,026, filed Dec. 18, 1975, to employ iron compounds as fire retardant additives in polymer compositions prepared from halogen containing unsaturated polyester resins. In Ser. No. 383,747, filed July 30, 1973, now abandoned, and copending application Ser. No. 584,447 filed June 6, 1975, it is disclosed that copper compounds can be advantageously employed as fire retardant additives in halogen-containing unsaturated polyester resins. In aforementioned application Ser. No. 490,423, now abandoned, and aforementioned copending application Ser. No. 692,624 filed June 3, 1976, it is disclosed that iron compounds may be advantageously combined with copper compounds and/or antimony compounds to provide a composition useful as a fire retardant additive in halogen containing unsaturated polyester resins. The polymeric compositions prepared in accordance with the aforementioned three copending applications exhibit excellent fire retardant properties, including low smoke generation. However, it has not been found that substantial improvements in fire retardance and low smoke generation are achieved in such compositions when the halogen containing unsaturated polyesters are crosslinked with certain combinations of unsaturated monomers in a manner described hereinbelow.

Accordingly, it is an object of this invention to provide superior fire retardant polymer compositions based on unsaturated polyester resins that not only have low burning rates, but also exhibit low smoke generation when in contact with a flame.

It is also an object of the invention to provide superior fire retardant polyester resins that develop a beneficial, insulating layer of char in the presence of a flame which inhibits further combustion of the polymer.

It is still another object of the invention to provide polymer compositions based on unsaturated polyester resins wherein substantial improvements in fire retardance are achieved without diminishing or deteriorating other useful properties of the polymer system.

These and other objects are accomplished by this invention which is described in detail hereinafter.

SUMMARY OF THE INVENTION

The present invention is directed to an advantageous embodiment of the fire retardant polymer compositions of aforementioned application Ser. No. 514,984 which comprise:

(1) a copolymerizable mixture of:
  (a) from about 50 to 80 wt % of an α,β, ethylenically unsaturated halogen-containing polyester of a polycarboxylic compound and a polyhydric alcohol, the polyester containing halogen in a proportion of greater than about 4 weight percent; and
  (b) from about 20 to about 50 weight of a mixture of unsaturated monomers comprising a vinyl benzene compound and an acrylic compound selected from the group consisting of acrylic acid, methacrylic acid and esters of these acids, the weight ratio of vinylbenzene to acrylic compound being about 1:4 to 4:1; and (2) an effective fire retardant proportion of about 0.5 to about 10 weight percent of a smoke inhibiting additive comprising at least 0.5 weight percent of a compound of iron with the proviso that when the additive comprises as the sole component thereof a compound of iron that is soluble in said polyester, the compound of iron is free of iron-to-carbon bonds, the composition being substantially phosphorus-free and the proportions and weight percents being based on the weight of the copolymerizable mixture. According to the embodiment of the invention the halogenated polyester charged comprises a halogenated polyester wherein the halogen substituent or substituents are introduced subsequent to preparation of the polyester by esterification.

The smoke inhibiting additive may comprise a compound of iron as the sole effective component thereof or may preferably comprise a mixture of a compound of iron with a compound of copper and/or a compound of antimony, the compound of iron being present in an amount of at least about 0.5 weight percent and the total additive or additive mixture being present in an amount of up to about 10 weight percent, based on the weight of the copolymerizable mixture.

The additive may be incorporated in the polymer composition by adding and mixing with the copolymerizable mixture or to either component thereof prior to mixing. Final polymerization or curing of the copolymerizable mixture may be facilitated with the addition of a suitable polymerization catalyst and/or promoter. If it is desired that the polymerizable mixture is to be stored and/or shipped prior to final polymerization and cure, a polymerization inhibitor may advantageously be added.

Thus it will be seen that the present invention relates to fire retardant polymer compositions containing the aforementioned smoke inhibiting additive and in one aspect these compositions comprise a copolymerizable mixture, and in a second aspect, the copolymerized product thereof.

The fire retardant polymer compositions of the present invention are useful in the preparation of castings, laminated products, reinforced articles and the like having low burning rates, low smoke generation and beneficial char formation in the presence of a flame.

DESCRIPTION OF EMBODIMENTS

The Unsaturated Polyesters

The unsaturated polyesters useful in the invention are halogenated unsaturated polyesters wherein the halogen substituents are introduced into the polyester subsequent to preparation of the polyesters by esterification. Such halogenated unsaturated polyesters, which conveniently may be termed post-halogenated polyesters, can be advantageously prepared by the procedure of Toggweiler et al U.S. Pat. No. 3,536,782. In the latter process, base polyester is prepared by reaction of a polycarboxylic acid reactant comprising at least one alpha, beta ethylenically usaturated dicarboxylic acid or anhydride containing up to about 20 carbon atoms per molecule with at least one compound containing aliphatic unsaturation having a halogenation rate faster than that of the alpha, beta-ethylenically unsaturated dicarboxylic acid or anhydride selected from the group consisting of polyhydric alcohols, of 2 to 24 carbon atoms per molecule, containing active unsaturation which is subject to subsequent halogenation and a mixture of at least one polyhydric alcohol having about 2 to 24 carbon atoms with at least one ethylenically unsaturated dicarboxylic acid or anhydride containing up to about 20 carbon atoms free of alpha, beta ethylenic unsaturation other than aromatic unsaturation, and thereafter is halogenated by reaction with halogen sufficient to produce a halogenated polyester containing 10 to 60 weight percent halogen substituent, employing a solvent, such as methylene dichloride, which is not readily susceptible to halogenation and a halogenation temperature of about $-50°$ to $+50°$ C.

While conventional halogenated unsaturated polyesters are satisfactory in many respects for preparing flame retardant resins with unsaturated comonomers as disclosed in aforementioned Ser No. 514,984, post halogenated unsaturated polyesters have several distinctions from the conventional polyesters which in some applications amount to important advantages as disclosed in aforementioned U.S. Pat. No. 3,536,782.

The aforementioned technique for preparing post halogenated unsaturated polyester (including suitable polycarboxylic compound reactants, polyhydric alcohol reactants, catalysts, halogen reactants, reactant proportions, reaction conditions, reaction solvents and the like) is disclosed in greater detail in the aforementioned Toggweiler et al patent, which pertinent disclosure is incorporated herein by reference.

The unsaturated polyester resins of this invention contain greater than about 4 weight percent up to about 40 weight percent or more of halogen based on the weight of the unsaturated polyester resin and copolymerizable unsaturated monomers. The preferred halogenated unsaturated polyesters are those wherein the halogen is chlorine or bromine or a combination thereof. Especially preferred are polyester resins wherein the halogen is bromine. The proportion of halogen is preferably greater than 15 weight percent and even more preferably, greater than 20 weight percent when the halogen is chlorine.

The halogen can be provided in the polyesters of the invention by a combination of the foregoing method and the methods described in aforementioned U.S. application Ser. No. 514,984 of which the present application is a continuation-in-part. In other words the halogenated unsaturated polyester ingredient of the present composition can be a mixture of a substantial proportion of the present post-halogenated polyester and a conventional halogenated polyester. Thus, for example, the unsaturated polyester can be a mixture of the present post-halogenated polyester and a conventional halogenated polyester prepared using a halogenated dibasic acid such as chlorendic acid, and a brominated alcohol such as dibromopropanol. The disclosure of the aforementioned application Ser. No. 514,984 pertaining to the description and preparation of such conventional halogenated polyesters from polycarboxylic compounds and polyhydric alcohols is incorporated herein by reference.

Unsaturated Monomers

The superior fire retardant properties, especially smoke retardance, of the polymeric compositions of this invention result in part, from the use of certain combinations or mixtures of unsaturated monomers to cure or cross-link the halogen-containing ethylenically unsaturated polyesters. More specifically, the unsaturated monomers comprise a mixture of a vinyl benzene compound and an acrylic compound. Suitable vinyl benzene compounds include, for example, styrene, alpha-methyl styrene, chloromethyl styrene, vinyl toluene, and the like and mixtures thereof.

Suitable acrylic compounds are acrylic acid, methacrylic acid and esters thereof and mixtures. The esters of acrylic acid and methacrylic acid that may be employed include for example, the alkyl esters such as methyl acrylate, methyl methacrylate, ethyl acrylate, ethyl methacrylate, propyl acrylate, propyl methacrylate, isopropyl acrylate, isopropylmethacrylate, butyl acrylate, butyl methacrylate, isobutyl acrylate, isobutyl methacrylate, sec-butyl acrylate, sec-butylmethacrylate, tert-butyl acrylate, tert-butylmethacrylate, pentyl acrylate, pentyl methacrylate, hexylacrylate, heptylacrylate, heptyl methacrylate, octylacrylate/octylmethacrylate, 2-ethylbutylacrylate, 2-ethylbutyl methacrylate, 2-ethylhexyl acrylate, 2-ethylhexyl methacrylate, and the like as well as the hydroxyalkyl acrylates and methacrylates, such as hydroxymethyl acrylate, hydroxymethyl methacrylate, hydroxyethyl acrylate, hydroxyethylmethacrylate, hydroxypropyl acrylate, hydroxypropyl methacrylate, hydroxybutyl acrylate, hydroxybutyl methacrylate, hydroxyoctylacrylate, hydroxyoctyl methacrylate, and the like, and the alkoxyalkyl acrylates and methacrylates such as 2-ethoxyethyl acrylate, 2-ethoxyethyl methacrylate, 2-methoxyethyl acrylate, 2-methoxyethyl methacrylate, 2-n-butoxyethylacrylate, 2-n-butoxyethyl acrylate, 2-n-butoxyethyl dimethacrylate, hexyloxyethyl acrylate, hexyloxyethyl methacrylate and the like, and mixtures of these. Other suitable acrylic compounds include, for example, aromatic esters of acrylic and methacrylic acid such as benzyl acrylate, alpha-naphthyl acrylate, beta-naphthyl acrylate, phenyl acrylate, and the like and the corresponding mathacrylates. Also suitable are halogen containing esters such as the haloalkyl esters including for example, bromoethyl acrylate, bromoethyl methacrylate, chloroethyl acrylate, chloroethyl methacrylate, dichloropropyl acrylate, dichloropropyl methacrylate, dibromopropyl acrylate, dibromopropyl methacrylate, 2,2,2-trifluoroethyl acrylate, 2,2,2-trifluoroethyl methacrylate, 2,2,2-tribromoethyl acrylate, 2,2,2-tribromoethyl methacrylate, hexafluoroisopropyl acrylate, hexafluoroisopropyl methacrylate, as well as other halogen containing acrylic compounds such as pentachlorophenyl acrylate, 2-chloroacrylic acid, bicyclo(2.2.1)-5-heptene-2-methyl methacrylate, methyl-2-chloroacrylate, methyl-2-bromoacrylate, 1,1-dihydroperfluoroethyl methacrylate, and the like.

Other suitable acrylic compounds include, for example, 2-phenoxy acrylate, 2-nitroethyl acrylate, allyl acrylate, methallyl acrylate, propargyl acrylate, ethylene glycol monoacrylate, propylene glycol monoacrylate, tetrahydrofurfuryl acrylate, vinyl acrylate, beta-cyanoethyl acrylate, cyclopentyl acrylate, cyclohexyl acrylate, furfuryl acrylate, glycidyl acrylate, glyceryl monoacrylate, lead acrylate, ferric acrylate, zinc acrylate, allylacrylamide cinnamyl acrylate, isobutyl-2-cyanoacrylate, n-butyl-2-cyanoacrylate, propyl-2-cyano acrylate, methyl-2-cyanoacrylate, cyclol acrylate, dimethyl malate acrylate, diethyl malate acrylate and the like as well as the corresponding methacrylates.

For the preparation of fire retardant polymers having a higher cross-linking density, a greater hardness and higher heat deflection temperature, the acrylic component of the monomer mixture may be selected from various polyacrylic compounds, especially the di- and tri-acrylates or methacrylates. Typical of such compounds which may be employed in accordance with the present invention are ethylene glycol diacrylate, ethylene glycol dimethacrylate propylene glycol diacrylate, propylene glycol diacrylate, butylene glycol dimethacrylate, ethylene diacrylate, ethylene dimethacrylate, ethylidene diacrylate, ethylidene dimethacrylate, trimethylolpropane diacrylate, trimethylolpropane dimethacrylate, trimethylolethane trimethacrylate, pentaerythritol triacrylate pentaerythritol tetraacrylate, pentaerythritol tetramethacrylate, triethylene glycol dimethacrylate, trimethylolpropane triacrylate, trimethylol propane trimethacrylate, tetraethylene glycol diacrylate, bisphenol A dimethacrylate, bisphenol A diacrylate, ethoxylated bisphenol A diacrylate, ethoxylated bisphenol A dimethacrylate, propoxylated bisphenol C diacrylate, 2,2',6,6'-tetrabromobisphenol A dimethacrylate, tetramethylene diacrylate, tetramethylene dimethacrylate, neopentyl glycol diacrylate, neopentyl glycol dimethacrylate, glycerol triacrylate, glycerol trimethacrylate, 2,3-dibromoneopentyl glycol diacrylate, 2,3-dibromoneopentyl glycol dimethacrylate, 2,3-dibromo-2-butene-1,4-diol diacrylate, trans-2,3-dibromo-1-butene-1,4-diol diacrylate 2-butyne-1,4-diol dimethacrylate, crotylacrylate, 1,2,6-hexanetriol diacrylate, 2-butene-1,4-diacrylate, 2-butene-1,4-dimethacrylate, 1,4-cyclohexyl diacrylate, 1,4-cyclohexyl dimethacrylate, p-xylene diacrylate, 1-phenylethylene 1,2-dimethacrylate, 1,3-propanediol diacrylate, 1,3-propanediol dimethacrylate, and the like.

The preferred acrylic compounds are the alkyl-, hydroxy-alkyl-, and haloalkyl-acrylates and methacrylates wherein the alkyl group is from 1 to 8 carbon atoms.

The monomer composition may be admixed in the polymer in an amount sufficient to produce a thermoset polymer and the admixture heated to an elevated temperature in the presence of a suitable catalyst to cross-link or cure the polymer. With proper catalyst systems such as cobalt naphthenate and methylethyl ketone peroxide, room temperature cures are obtained.

The mixture of unsaturated monomers can be advantageously combined with the polymerizable polyester while both are at an elevated temperature thereby facilitating solution and mixing. To prevent premature polymerization at this stage, a polymerization inhibitor is advantageously added to the mixture, or preferably to one of its components prior to mixing, especially if the mixture is to be stored or shipped in commerce prior to curing. Alternatively, or in addition to including a polymerization inhibitor, a catalyst and/or promoter for the copolymerization may be added, particularly if it is desired to make available in commerce a composition which is ready for polymerization and does not require further chemical additions in order to be used, as is commonly known in the art.

The polymerization inhibitors generally are added in the order of 0.001 to 1 weight percent of the mixture. Among the inhibitors which may advantageously be employed to prevent the premature polymerization of the mixture of polymerizable polyester and unsaturated monomers, particularly if the mixture is to be stored or shipped in commerce prior to curing, are substances such as hydroquinone, benzoquinone, para-tertiarybutyl catechol, para-phenylene diamine, trinitrobenzene, picric acid and the like.

The proportion of unsaturated monomer mixture may vary considerably but preferably ranges from about 20 to about 50 percent by weight of the copolymerizable mixture and most preferably from about 25 to about 35 percent by weight of the copolymerizable mixture. Polymerization catalysts are preferably added to the mixture of unsaturated polyester and olefinic cross-linking agent to effect setting or curing. Catalysts such as benzoyl peroxide, acetyl peroxide, lauryl peroxide, methylethyl ketone peroxide, cumene hydroperoxide and the like are satisfactory. Such catalysts are generally used in proportions of 0.01 to ten percent of the total resin, depending on the efficiency of their action and whether or not substances which inhibit polymerization are present in the mixture. The polymerization reaction can also be hastened by adding promoters such as metals or metal salts, cobalt resinates, cobalt maleate, cobalt naphthenate and the like, or amines such as dibutylamine, or mercaptans such as dodecyl mercaptan. These are used in proportions similar to or smaller than that stated for the catalysts.

Smoke-Retardant Additive

The smoke retardant additive which is incorporated in the copolymerizable mixture in accordance with this invention, comprises a compound of iron as the sole fire-retardant additive or as a component of an additive mixture comprising a compound of iron and a compound of copper and/or a compound of antimony. Substantial improvement in fire-retardance and smoke retardance of the polymer is achieved when the additive is employed in a proportion of from about 0.5 to about 10, preferably from about 1 to 5, weight percent and including at least about 0.5 weight percent of iron compound based on the weight of the copolymerizable mixture. When the additive comprises a mixture of compounds of iron, copper, and/or antimony, it is preferred to employ a weight ratio of iron compound:copper and/or antimony compound of from about 1:5 to about 5:1. Most preferred are additives comprising an iron compound and an antimony compound in a weight ratio of iron compound:antimony compound of from about 1:5 to about 5:1.

The additive may contain iron or iron and copper and/or antimony in various forms including various inorganic and organic compounds of each. Based on effectiveness, availability, economic and other considerations, inorganic compounds are preferred. Especially preferred when the translucency of the final resin is not an objective are the common oxides of iron, copper and antimony. However, various other compounds may be selected depending on the properties desired in the cured product. For example, where it is desired to retain the translucent character of the unsaturated polyester, it is advantageous to employ colorless salts, that is compounds of iron and copper and/or antimony that permit the transmission of light when incorporated in the polyester resin system and to minimize the proportions of opaque compounds such as the oxides. It has been found that up to about one-half weight percent of an opaque additive may be employed without an undue loss of translucency.

The Iron Compounds

In the preparation of translucent polyester laminates and other products of the invention, iron salts that permit the transmission of light when incorporated in the cured polyester are preferred. Suitable iron salts are the colorless iron salts such as ferric sulfate hydrates. Other suitable salts which permit light transmission in the cured polyester include ferric fluoride, ferrous fluosilicate ferrous hydroxide, ferrous sulfate, ferrous tartrate, ferrous stannate, ferrous chloride, ferrous ammonium sulfate, and the like.

Other substantially insoluble iron compounds that can be used in accordance with the invention include ferric acetate, ferric formate, ferric borate, ferric tungstate, ferric vanadate, ferric molybdate, ferrous tungstate, ferric oxalate, ferric ferrocyanide, ferric chlorendate, and ferric hexachloronorbornene carboxylate.

Especially useful in the compositions of the invention are the iron oxides, such as $Fe_2O_3$, $Fe_3O_4$ and FeO. In this specification including the examples thereof and in the claims the formula $Fe_2O_3$ is used to characterize ferric oxide, in its various polymorphic forms and hydrates, e.g., yellow iron oxide and red iron oxide.

The iron compounds named hereinabove are substantially insoluble in the polyester when admixed with a copolymerizable unsaturated monomer. Also useful are iron compounds that are soluble in the admixture of polyester and copolymerizable unsaturated monomer. Soluble iron compounds which are free of iron-to-carbon bonds are preferred. Useful soluble iron compounds include the metal or metalloxy beta-ketoenolates of the formula:

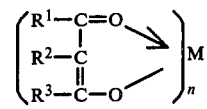

in which M is an iron ion, an ironoxy ion, or an iron hydroxy ion, in which n is an integer equal to the valence of the iron, ironoxy ion or iron hydroxy ion, in which each of $R^1$ and $R^3$ is a substituent selected from the group consisting of hydrogen and an organic substituent selected from alkyl, aryl, cycloalkyl, aralkyl, alkaryl, alkoxy, and aryloxy having one to eight carbon atoms and wherein each aryl substituent is carbocyclic, and in which $R^2$ is selected from the group consisting of $R^1$, $R^3$, halogen, nitro, and sulfo. Typical beta-ketonolates are the ferrous or ferric acetylacetonates.

Other soluble iron compounds include the iron carboxylates, particularly derivatives of carboxylic acids for example of about 3 to 22 carbon atoms. Illustrative iron carboxylates are iron acrylate, iron oleate, iron naphthenate, iron stearate, iron laurate, iron linoleate, and the like.

The Copper Compounds

In the preparation of translucent polyester laminates and other products of the invention, copper salts that permit the transmission of light when incorporated in the cured polyester are employed. Suitable copper salts are the colorless copper salts such as anhydrous copper sulfate and copper cyanide. Other suitable salts which permit light transmission in the cured polyester include cupric chloride, cupric bromide, copper chloride dihydrate, copper sulfate pentahydrate, copper hydroxide chloride (paratacamite), basic copper chloride (atacamite), copper oxychloride (a mixture of paratacamite and atacamite), copper carbonate, copper borate, and the like. The copper compounds named hereinabove are substantially insoluble in the polyester when admixed with a copolymerizable unsaturated monomer.

Other substantially insoluble copper compounds that can be used in accordance with the invention include copper chlorendate, copper tungstate, copper molybdate, copper tetrafluoroborate, copper thiocyanate, copper chromate, cupric formate, cupric gluconate, cupric oxalate, copper phthalocyanine, cupric tartrate, and the like.

Especially useful in the compositions of the invention are the copper oxides, such as cuprous and cupric oxides Other copper compounds are cupric ethylacetoacetate, copper glycinate, cupric hexafluoroacetylacetonate, cupric hydroxyacetate, cupric lactate, cupric naphthenate, cupric octoate, cupric propionate, cupric stearate, cupric acetylacetonate, cupric butyrate, cupric isobutyrate, cupric citrate, cupric cyclohexanebutyrate, cupric dimethyl dithiocarbamate, cupric trifluoroacetylacetonate and cupric undecylenate.

The Antimony Compounds

The antimony constituent of the additive mixture is preferably antimony trioxide. However a wide variety of other antimony compounds may be employed, including the tetraoxide, pentaoxide, and various other inorganic compounds of antimony as well as the various organic compounds of antimony. Inorganic compounds include, for example, the antimony oxides, antimony sulfides, antimony tribromide, antimony trichloride, antimony tetrachloride, antimony trifluoride, antimony pentafluoride, antimony triiodide, antimony pentaiodide, antimony oxychloride, antimony trisulfate, antimony trisulfide, antimony triselenide, antimony pentasulfide, antimony tritelluride, antimony tetrasulfide, antimony oxysulfide, antimony potassium tartrate, sodium antimonite, potassium antimonate, and the like. Colorless antimony compounds such as antimony trichloride, antimony tribromide, antimony trifluoride, sodium antimonate and the like may be advantageously employed in the preparation of translucent resins. Many organic antimony compounds are suitable such as the antimony salts or organic acids and their pentavalent derivatives, disclosed in U.S. Pat. No. 2,966,528 issued Aug. 15, 1961, entitled "Trivalent Antimony Salts of Organic Acids and Their Pentavalent Derivatives and Methods of Preparing Same". Compounds of this class include antimony butyrate, antimony valerate, antimony caproate, antimony heptanoate, antimony caprylate, antimony perlargonate, antimony caprate, antimony cinnamate, antimony anisate, and their pentavalent dihalide derivatives. Likewise there may be employed the esters of antimonous acids and their pentavalent derivatives disclosed in U.S. Pat. No. 2,993,924, issued July 25, 1961, entitled "Esters of Antimonous Acid and Their Pentavalent Derivatives and Methods of Preparing Same", such as tris(n-octyl) antimonite, tris (2-ethylhexyl) antimonite, tribenzyl antimonite, tris ($\beta$-chloropropyl) antimonite, tris ($\beta$-chloroethyl) antimonite, tris ($\beta$-chlorobutyl) antimonite, tris (butyl) antimonite and their pentavalent dihalide derivatives. Other suitable antimony compounds include the antimony esters of polyhydroxy compounds disclosed in U.S. Pat. No. 3,676,476 issued July 11, 1972, entitled "Method For Producing Trivalent and Pentavalent Antimony Esters of Polyhydroxy Compounds". Still other suitable organic antimony compounds are the cyclic antimonites such as trimethylolpropane antimonite, pentaerythritol antimonite, and glycerol antimonite.

Other iron, copper and antimony compounds which have desirable fire retardant properties, but which adversely affect the stability or cure of the polymer compositions can be employed if such compounds are used in an inactive form such as encapsulated or reacted or complexed with another compound. Such compounds include for example, ferric chloride copper acetylacetonate, cuprous chloride, cupric nitrate, cupric acetate, copper acrylate, copper naphthenate, copper stearate, and antimony sulfate. These compounds can be encapsulated for example, with gelatin or other polymeric materials. Alternatively the compounds can be reacted or complexed with compounds such as nitro compounds or aromatic ethers or amines. An example of a suitable compound of this type is an amine salt of ferric chloride. In some instances, iron, copper or antimony compounds which are normally detrimental to the stability and/or cure of the resin when employed alone, can be employed without such detriment in a relatively smaller amount as a component in the additive mixture.

In addition, the additive mixture may be prepared from compounds, especially minerals, which contain both iron and copper and/or antimony, such as bornite ($5Cu_2S.Fe_2S_3$), or chalcopyrite ($Cu_2S.Fe_2S_3$).

The additive is preferably incorporated into the polyesters in a finely divided form. Preferred are particles passing through a 200 mesh standard sieve. Where translucent polyester products are desired, the additive mixture should not contain a sufficient quantity of particles in the size range approximating the wavelength of light, i.e., about 0.1 to 1.0 microns, to cause undesirable light scattering and resultant decrease in translucence. In practice it has been observed that iron compounds pulverized to pass completely through a 325 mesh screen contain sufficient fine particles to reduce the translucency of the polyester.

For best results, the compositions of this invention are essentially phosphorus-free, i.e., exclude phosphorus and compounds of phosphorus. Although the reason is not fully understood, it has been found that phosphorus tends to reduce or degrade the advantageous fire retardant properties achieved in the compositions of this invention.

The Curing Process

The polymerization conditions for effecting the cross-linking reaction between the unsaturated polyesters of this invention and the monomeric cross-linking agent may be selected from a wide variety of techniques but usually involve the application of heat or light. Although pressure is not a required condition for effecting polymerization of the polymerizable mixtures embraced within this invention, it is sometimes advantageously employed, particularly when it is desired to make laminates in preformed shape. The pressures found satisfactory for this purpose are relatively low compared to those required for molding or laminating other type resins than involved herein and may be of the order of that obtained by pressing glass plates having a fiber glass mat or laminate impregnated with the polyester resin sandwiched therebetween.

The temperature at which polymerization is effected depends on a variety of factors, particularly the boiling point of the monomer mixture employed as cross-linking agent and the exothermic characteristics of the polymerization mixture. A temperature is selected which will give a suitable reaction rate and yet not cause substantial volatilization; and in the case of producing very thick castings, which will not produce a product which is crack-crazed.

The properties of the compositions of this invention can be varied substantially by incorporating modifying agents before, during or after any of the processing steps employed. For example, instead of producing articles of commerce from the compositions of this invention which are in the form of castings or laminates as previously described herein, a foamed type article may be made by incorporating a small percentage of a foaming agent such as sodium bicarbonate into the solution of unsaturated polyester dissolved in mono-olefin and thereafter effecting the copolymerization in the presence of catalyst and heat to produce the foamed article. Formulations which are useful for making moldings embodying the compositions of this invention may be made by mixing into the unsaturated linear polyester and unsaturated monomer mixture, an inert filler such as chopped fiber glass rovings, macerated fabric, asbestos fibers, mica, etc., which serve as fibrous reinforcing media and incorporating a small percentage of a mold lubricant catalyst and/or promoter. A thermoplastic additive may be incorporated to control shrinkage. Auxiliary fire retardant additives such as hydrated alumina can be used to add to the fire retardance provided by the halogen and additive mixture of iron, and copper and/or antimony.

It is understood that dyes, pigments, plasticizers, lubricants and various other modifying agents are contemplated as being incorporated in certain formulations to produce compositions embraced in this invention in order to obtain or accentuate any given property.

The following examples are presented to illustrate this invention. It is to be understood that the examples are not to be construed as limiting the invention. In the examples and elsewhere in this specification and claims, all temperatures are in degrees Centigrade and all parts, proportions and percentages are by weight unless otherwise indicated.

EXAMPLE 1

A post-brominated unsatururted polyester was prepared in substantial accord with the procedure of U.S. Pat. No. 3,536,782 by esterifying about 361.6 parts of ethylene glycol with 424.5 parts of tetrahydrophthalic anhydride and 237.58 parts of maleic anhydride in the presence of 0.053 parts of tolyhydroquinone polymerization inhibitor under an inert atmosphere of nitrogen gas, recovering the resultant polyester and thereafter reacting the recovered polyester with molecular bromine in methylene chloride solution employing about 0.5 parts of bromine per part by weight of the polyester. The resultant brominated ester of ethylene glycol with tetrahydrophthalic anhydride and maleic anhydride was mixed with styrene and 2-hydroxyethylacrylate to provide a solution containing about 70% of the post-brominated unsaturated polyester, about 20% of styrene and about 10% of 2-hydroxyethylacrylate, i.e. about 30% of the unsaturated monomers based on the weight of the mixture of the brominated unsaturated polyester and said monomers.

EXAMPLE 2

Cured castings of the product mixture of polyester and comonomers of Example 1 were prepared by mixing 130 parts of the polyester-styrene-2-hydroxyethylacrylate solution with an iron compound (yellow iron oxide) or a mixture of an iron compound (yellow iron oxide) and an antimony compound (antimony trioxide) in the amounts indicated in the table below with 0.18 part by volume of liquid cobalt octoate (Cobalt Ten Chem containing 12% cobalt octoate in mineral spirits manufactured by Mooney Chemicals Inc.) After at least 10 minutes stirring to assure uniform dispersion of the immiscible materials, the polymerization catalyst, 0.8 part by volume of methyl ethyl ketone peroxide (60% solution in dimethyl terephthalate), was added to the resin mixture which was then stirred for 1 to 2 minutes. The resultant resin mixtures were allowed to cure in molds at 25° for 16 hours and then at 65° for 8 hours. The castings were then removed from the molds, and cut into specimen bars for testing. Burn rate and flame time were tested in accordance with the ASTM D-757-65 test method. Smoke density was tested using a modification of the ASTM D-2843-70, test method. Data on light absorption due to smoke obscuration was acquired by a computer which printed out the light absorption and percent smoke at one second intervals. The "Smoke Density Rating" of this modification of the ASTM test is the cumulative percent smoke at 60 seconds. Samples which were used for the ASTM D-2843-70 test measured 0.5 inch × 0.5 inch × 0.125 inch.

The results of these tests were reported in the following Table (wherein casting 2 is a control casting indicating the unsatisfactory long flameout time achieved when antimony trioxide is added by itself to the resin).

In the Table the weight percent of additives is based on the weight of the resin. Thus, for example, 2.0 weight percent of an additive compound or mixture indicates two parts by weight of the additive per one hundred parts of polymer composition derived from halogenated polyesters, styrene and 2-hydroxyacrylate mohomers.

TABLE

Fire Retardant Synergism of Iron Additive with Antimony Additive in Resin of Post Halogenated Unsaturated Polyester with Styrene and Acrylate Co-Monomers

| Casting No. | Compound | Weight Percent | Heat Distortion Temperature | ASTM D-757-65 Burn Rate (in/min.) | Flameout Time (secs) | Smoke Density Rating % |
|---|---|---|---|---|---|---|
| 1 | Iron oxide, yellow | 2 | 65° | 0.23 | 33 | 65.1 |
| 2 | Antimony oxide | 2 | 72° | 0.15 | 69 | 76 |
| 3 | Iron oxide, yellow and | 2 (1% iron oxide, | 68° | 0.22* | 27 | 77 |

TABLE-continued
Fire Retardant Synergism of Iron Additive with Antimony Additive in Resin of Post Halogenated Unsaturated Polyester with Styrene and Acrylate Co-Monomers

| Casting No. | Compound | Weight Percent | Heat Distortion Temperature | ASTM D-757-65 Burn Rate (in/min.) | Flameout Time (secs) | Smoke Density Rating % |
|---|---|---|---|---|---|---|
| | Antimony oxide | 1% antimony oxide) | | | | |

*In consideration of the 27 second flameout time, indicating an almost negligible period of burning the burn rate is essentially a charring rate.

In the foregoing table, the brief flameout time of casting 3 illustrates the synergistic improvement in fire retardancy achieved by use of mixtures of iron and antimony additives as the fire retardant additive in accordance with the invention.

As will be appreciated by those skilled in the art many modifications of the techniques and procedures of the foregoing Examples can be made without departing from the spirit or scope of the invention. For example, in place of the mixture of iron oxide and antimony trioxide as shown in Example 2, casting 3 of the Table, a mixture of one weight percent of antimony trioxide and 0.5 weight percent of a copper compound additive, such as cupric oxide can be used to provide a fire retardant composition having a desirable short flameout time similar to that of Casting 3 of Example 2. Also in place of yellow iron oxide other iron compound additives such as $FeSnO_3$, iron trifluoride or $FeSiF_6$ can be employed. In place of antimony oxide other antimony compounds such as antimony trichloride, antimony trisulfide, antimony potassium tartrate and sodium antimonate can be used. In place of the aforementioned cupric oxide additive other copper additives such as cuprous chloride, cupric intrate, or cupric stearate can be employed.

The foregoing specification is intended to illustrate the invention with certain preferred embodiments, but it is understood, as is illustrated above, that the details disclosed herein can be modified without departing from the spirit and scope of the invention.

What is claimed:

1. A fire retardant polyester polymer composition comprising
   (1) a mixture copolymerizable to an infusible resin consisting essentially of
      (a) from about 50 to 80 wt. % of an $\alpha,\beta$-ethylenically unsaturated halogen-containing polyester of a polycarboxylic compound and a polyhydric alcohol, the polyester comprising a post-halogenated $\alpha,\beta$-ethylenically unsaturated polyester and containing halogen in a proportion of greater than about 4 weight percent; and
      (b) from about 20 to about 50 weight percent of a mixture of unsaturated monomers comprising a vinyl benzene compound and an acrylic compound selected from the group consisting of acrylic acid, methacrylic acid and esters thereof, the weight ratio of vinylbenzene compound to acrylic compound being about 1:4 to 4:1; and
   (2) an effective fire retardant proportion of about 0.5 to about 10 weight percent of a smoke inhibiting additive consisting essentially of at least 0.5 weight percent of a compound of iron, a mixture of said iron compound with a compound of copper, a mixture of said iron compound with a compound of antimony or a mixture of said iron compound with a compound of copper and a compound of antimony with the proviso that when said additive is a compound of iron that is soluble in said polyester, the compound of iron is free of iron-to-carbon bonds, said composition being substantially phosphorus-free and said proportions and weight percents being based on the weight of the copolymerizable mixture.

2. The composition of claim 1 wherein said halogen is bromine.

3. The composition of claim 2, wherein said additive consists essentially of a compound of iron as the sole effective component thereof.

4. The composition of claim 3 wherein said vinylbenzene compound is styrene.

5. The composition of claim 4 wherein said acrylic compound is an ester of acrylic acid.

6. The composition of claim 5 wherein said additive is an inorganic compound of iron.

7. The composition of claim 6 wherein said acrylic compound is methyl acrylate.

8. The composition of claim 6 wherein said acrylic compound is 2-hydroxyethyl acrylate.

9. The composition of claim 8 wherein said additive is ferric oxide.

10. The composition of claim 8 wherein said additive is $FeSnO_3$.

11. The composition of claim 8 wherein said additive is $FeSiF_6$.

12. The composition of claim 8 wherein said additive is $FeF_3$.

13. The composition of claim 4 wherein said acrylic compound is an ester of methacrylic acid.

14. The composition of claim 13 wherein said additive is an inorganic compound of iron.

15. The composition of claim 9 wherein said mixture of unsaturated monomers comprises about 25 to about 35 weight percent of styrene and 2-hydroxyethyl acrylate and said additive consists essentially of from about 1.0 to about 5.0 weight percent of the ferric oxide based on the weight of said copolymerizable mixture.

16. The composition of claim 15 wherein the polyester is the post-brominated product of the ester of ethylene glycol with tetrahydrophthalic anhydride and maleic anhydride.

17. The composition of claim 1 wherein said additive consists essentially of a mixture of said iron compound with a compound of antimony, a mixture of said iron compound with a compound of copper, or a mixture of said iron compound with a compound of copper and a compound of antimony.

18. The composition of claim 17 wherein said additive consists essentially of a compound of iron and a compound of copper.

19. The composition of claim 17 wherein said additive consists essentially of a compound of iron and a compound of antimony.

20. The composition of claim 19 wherein said vinylbenzene compound is styrene.

21. The composition of claim 20 wherein said acrylic compound is methacrylic acid.

22. The composition of claim 21 wherein said mixture of unsaturated monomers comprises about 25 to about 35 weight percent of styrene and methacrylic acid based on the weight of said copolymerizable mixture and said additive consists essentially of 1.0 to 5.0 weight percent of a mixture of iron and antimony oxides in a weight ratio of iron oxide:antimony oxide of from about 1:5 to about 5:1.

23. The composition of claim 20 wherein said acrylic compound is an ester of methacrylc acid.

24. The composition of claim 23 wherein said additive is a mixture of an inorganic compound of iron and an inorganic compound of antimony.

25. The composition of claim 24 wherein said mixture of unsaturated monomers comprises about 25 to about 35 weight percent of styrene and the ester of methacrylic acid based on the weight of said copolymerizable mixture and said additive consists essentially of about 1.0 to about 5.0 weight percent of a mixture of iron and antimony oxides in a weight ratio of iron oxide:antimony oxide of from about 1:5 to about 5:1.

26. The composition of claim 25 wherein said acrylic compound is 2-hydroxyethyl methacrylate.

27. The composition of claim 25 wherein said acrylic compound is methyl methacrylate.

28. The composition of claim 27 wherein the polyester is the post-brominated product of the ester of ethylene glycol with tetrahydrophthalic anhydride with maleic anhydride.

29. The composition of claim 20 wherein said acrylic compound is an ester of acrylic acid.

30. The composition of claim 29 wherein said additive is a mixture of an inorganic compound of iron and an inorganic compound of antimony.

31. The composition of claim 30 wherein said mixture of unsaturated monomers comprises about 25 to about 35 weight percent of styrene and the ester of acrylic acid based on the weight of said copolymerizable mixture and said additive consists essentially of about 1.0 to about 5.0 weight percent of a mixture of iron and antimony oxides in a weight ratio of iron oxide:antimony oxide of from about 1:5 to about 5:1.

32. The composition of claim 31 wherein said acrylic ester is 2-hydroxyethyl acrylate.

33. The composition of claim 31 wherein said acrylic ester is methyl acrylate.

34. The composition of claim 31 wherein said acrylic ester is butyl acrylate.

35. The composition of claim 32 wherein said iron oxide is ferric oxide.

36. The composition of claim 35 wherein the polyester is the post-brominated product of the ester of ethylene glycol with tetrahydrophthalic anhydride and maleic anhydride.

37. The composition of claim 30 wherein said inorganic compound of iron is $FeSnO_3$.

38. The composition of claim 30 wherein said inorganic compound of iron is $FeF_3$.

39. The composition of claim 17 wherein said additive consists essentially of a compound of iron, a compound of copper and a compound of antimony.

40. The composition of claim 39 wherein said polycarboxylic compound is a mixture of tetrahydrophthalic anhydride and maleic anhydride and said mixture of unsaturated monomers comprises a mixture of styrene and methyl methacrylate or 2-hydroxyethyl acrylate.

41. The composition of claim 2 wherein said mixture of unsaturated monomers comprises a mixture of styrene and an acrylic compound selected from the group alkyl acrylates, alkyl methacrylates, hydroxyalkyl acrylates, hydroxyalkyl methacrylates, haloalkyl acrylates, and haloalkyl methacrylates wherein the alkyl group is from 1 to 8 carbon atoms.

42. The composition of claim 1 when polymerized to an infusible product.

43. The composition of claim 16 when polymerized to an infusible product.

44. The composition of claim 28 when polymerized to an infusible product.

45. The composition of claim 25 wherein said acrylic compound is ethylene dimethacrylate.

* * * * *

UNITED STATES PATENT AND TRADEMARK OFFICE
CERTIFICATE OF CORRECTION

PATENT NO. : 4,148,841

DATED : April 10, 1979

INVENTOR(S) : Willis T. Schwartz, Jr. et al.

It is certified that error appears in the above-identified patent and that said Letters Patent are hereby corrected as shown below:

The term of this patent subsequent to May 1, 1996 has been disclaimed.

Signed and Sealed this

Third Day of July 1979

[SEAL]

Attest:

Attesting Officer

LUTRELLE F. PARKER
Acting Commissioner of Patents and Trademarks

UNITED STATES PATENT AND TRADEMARK OFFICE
CERTIFICATE OF CORRECTION

PATENT NO. : 4,148,841

DATED : April 10, 1979

INVENTOR(S) : Willis T. Schwartz, Jr., et al.

It is certified that error appears in the above–identified patent and that said Letters Patent are hereby corrected as shown below:

The Certificate of Correction issued July 3, 1979 has been cancelled.

*Signed and Sealed this*

*Twenty-fourth* Day of *July 1979*

[SEAL]

Attest:

Attesting Officer

LUTRELLE F. PARKER
*Acting Commissioner of Patents and Trademarks*